United States Patent [19]
Misso

[11] Patent Number: 5,983,485
[45] Date of Patent: Nov. 16, 1999

[54] DUAL DISC DRIVE ACTUATOR ASSEMBLY FABRICATION

[75] Inventor: Nigel F. Misso, Bethany, Okla.

[73] Assignee: Seagate Technology, Inc., Scotts Valley, Calif.

[21] Appl. No.: 09/109,533

[22] Filed: Jul. 2, 1998

Related U.S. Application Data

[60] Provisional application No. 60/075,323, Feb. 20, 1998.

[51] Int. Cl.$^6$ ........................................................ G11B 5/42
[52] U.S. Cl. ........................ 29/603.03; 360/104; 360/106
[58] Field of Search ........................ 29/603.03; 360/104, 360/106

[56] References Cited

U.S. PATENT DOCUMENTS

| | | |
|---|---|---|
| 4,799,112 | 1/1989 | Bremmer et al. . |
| 5,218,496 | 6/1993 | Kaczeus . |
| 5,262,907 | 11/1993 | Duffy et al. . |
| 5,267,110 | 11/1993 | Ottesen et al. . |
| 5,343,345 | 8/1994 | Gilovich . |

*Primary Examiner*—Carl E. Hall
*Attorney, Agent, or Firm*—Crowe & Dunlevy

[57] ABSTRACT

A method for fabricating a dual actuator assembly for a disc drive. The dual actuator assembly has first and second rotatable actuator assemblies which are axially aligned for independent rotation about a common axis and support at least first and second read/write heads, respectively. The method comprises providing a dual bearing cartridge assembly with a stationary shaft aligned along the common axis having first and second ends, a first rotatable sleeve mounted for rotation about the stationary shaft toward the first end, a second rotatable sleeve mounted for rotation about the stationary shaft toward the second end, and first and second bearing assemblies supporting the first and second rotatable sleeves, respectively. A support member is inserted between the first and second rotatable sleeves to provide a bearing support force in oppostion to the preload force of the first and second bearing assemblies, allowing attachment of the first and second actuator assemblies to the first and second rotatable sleeves, respectively while preventing damage to the bearing assemblies.

5 Claims, 9 Drawing Sheets

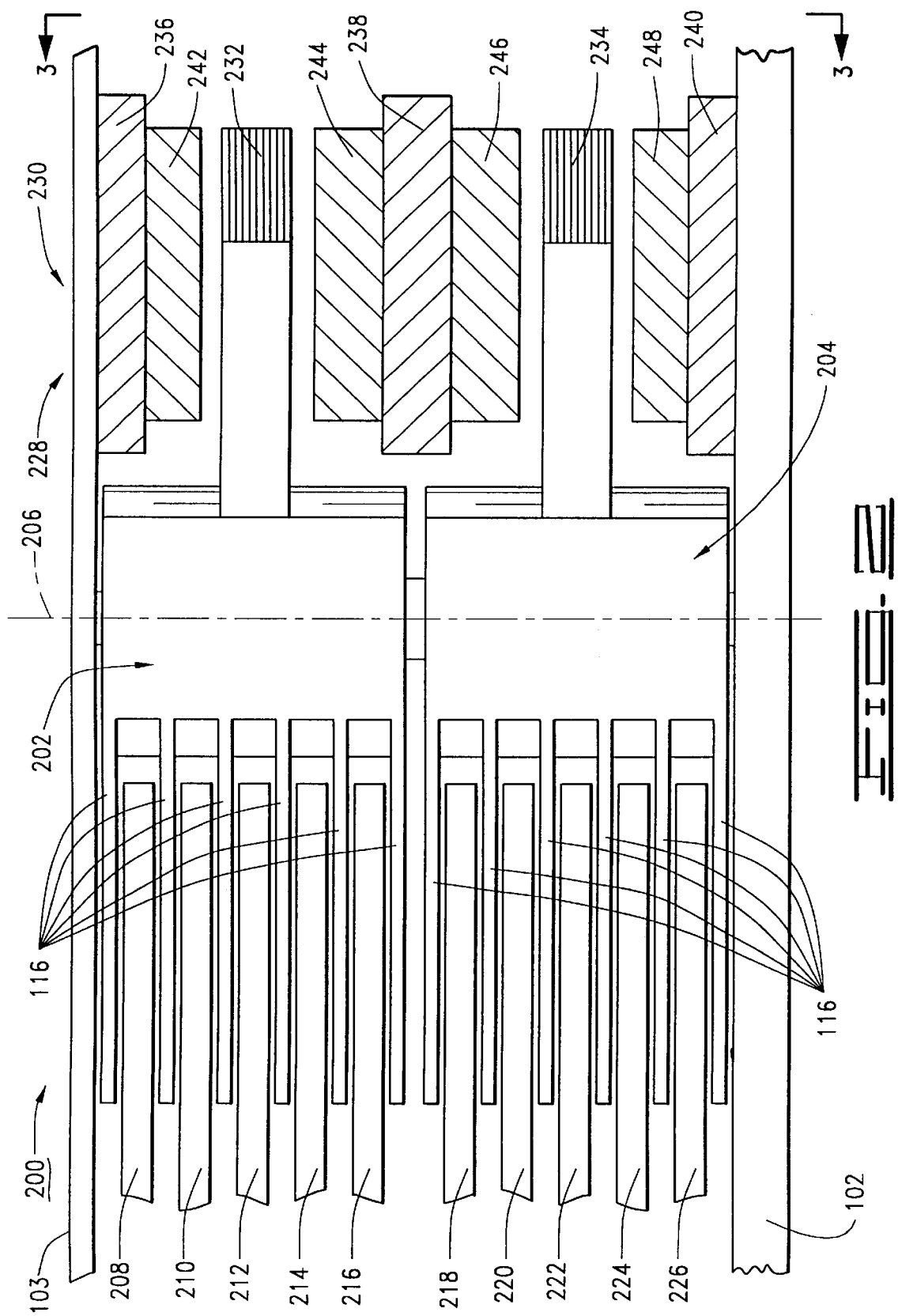

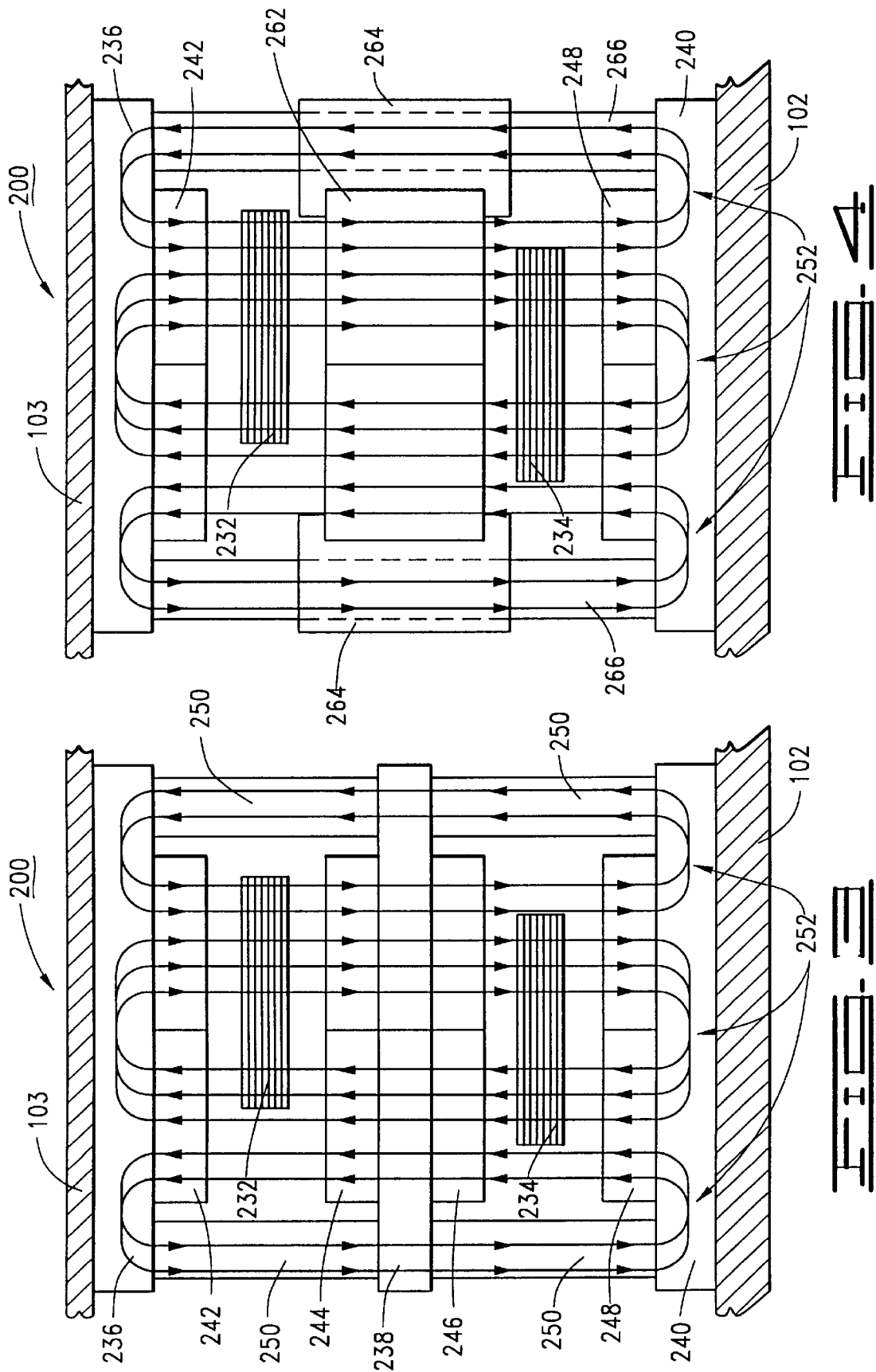

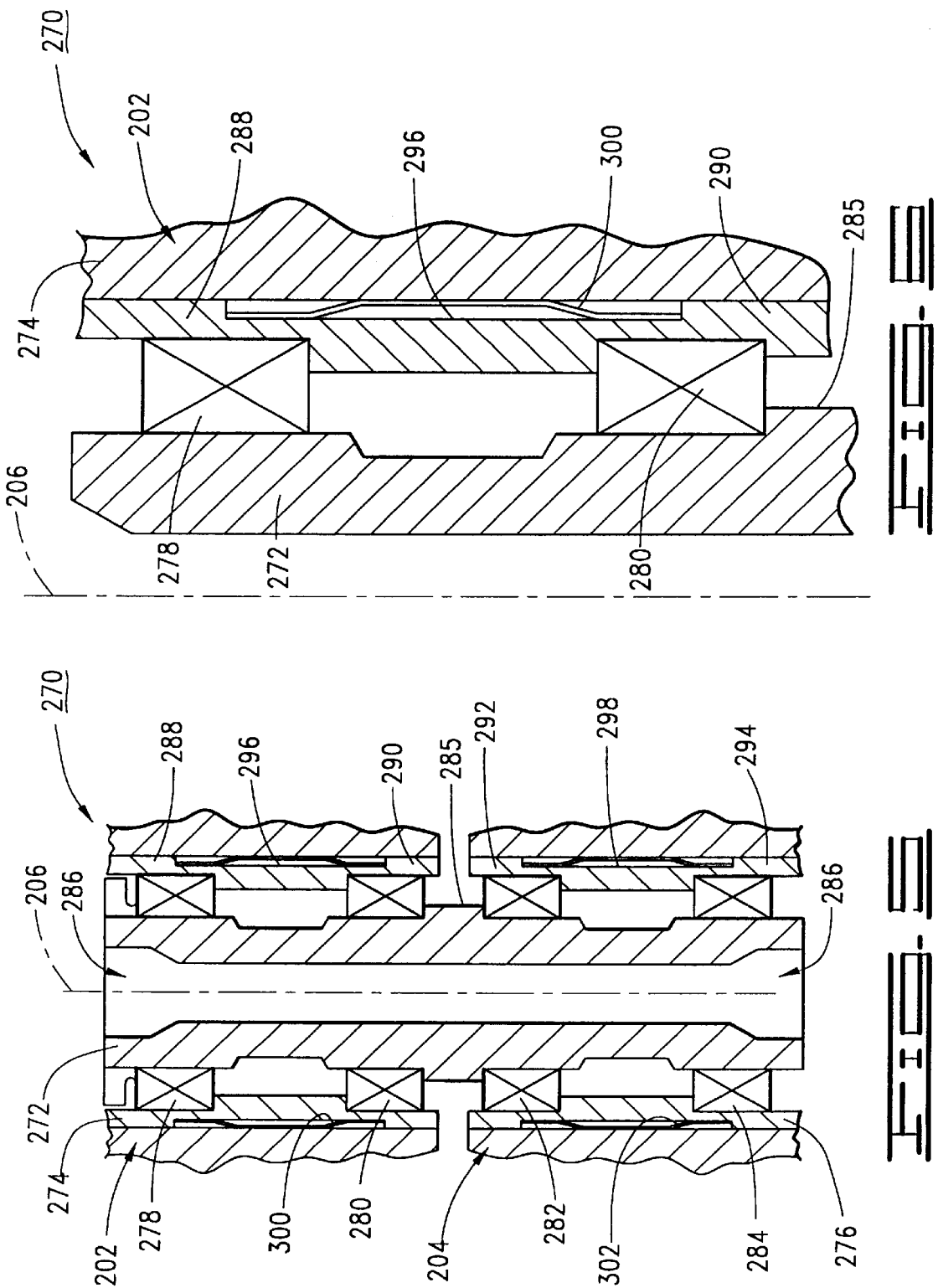

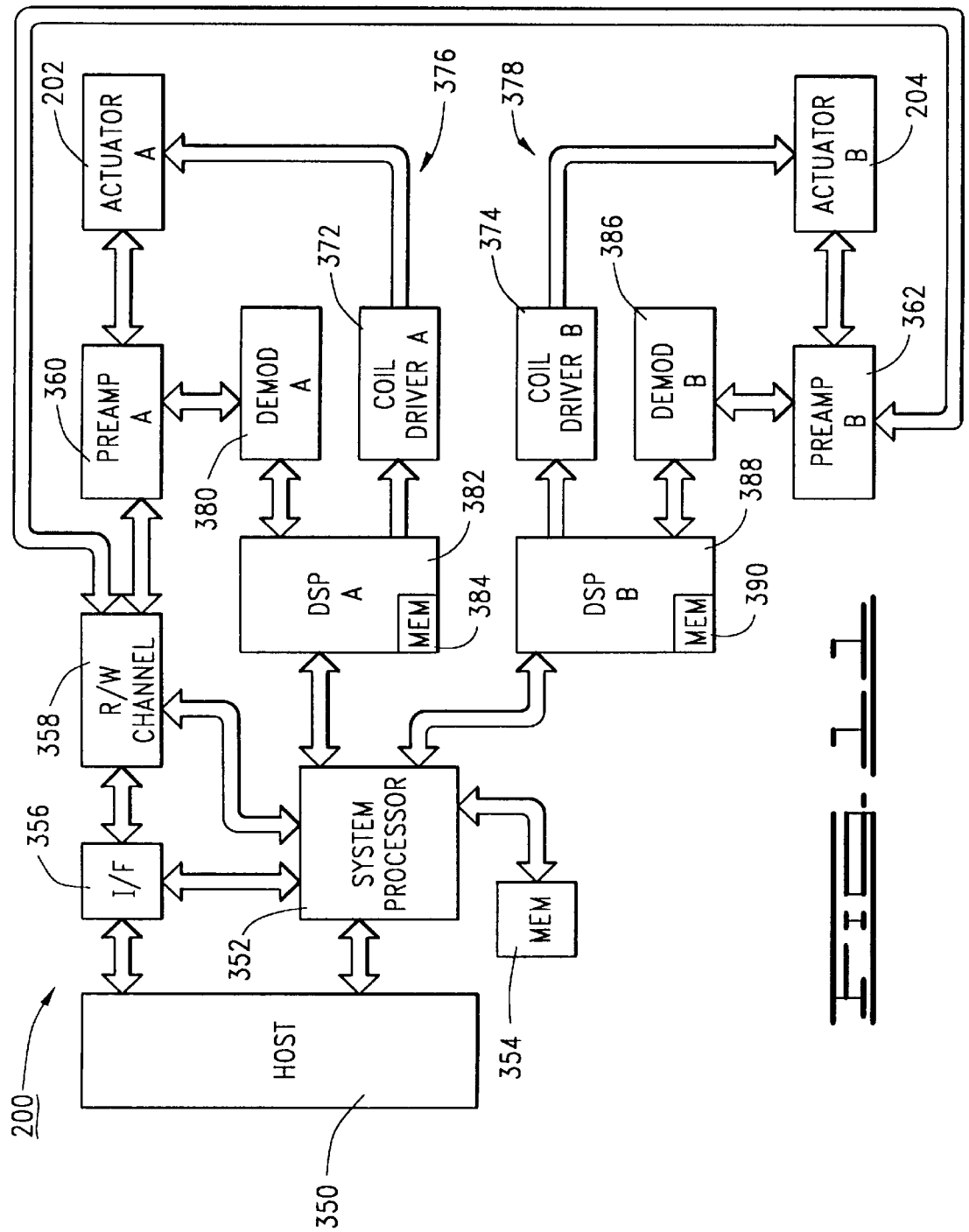

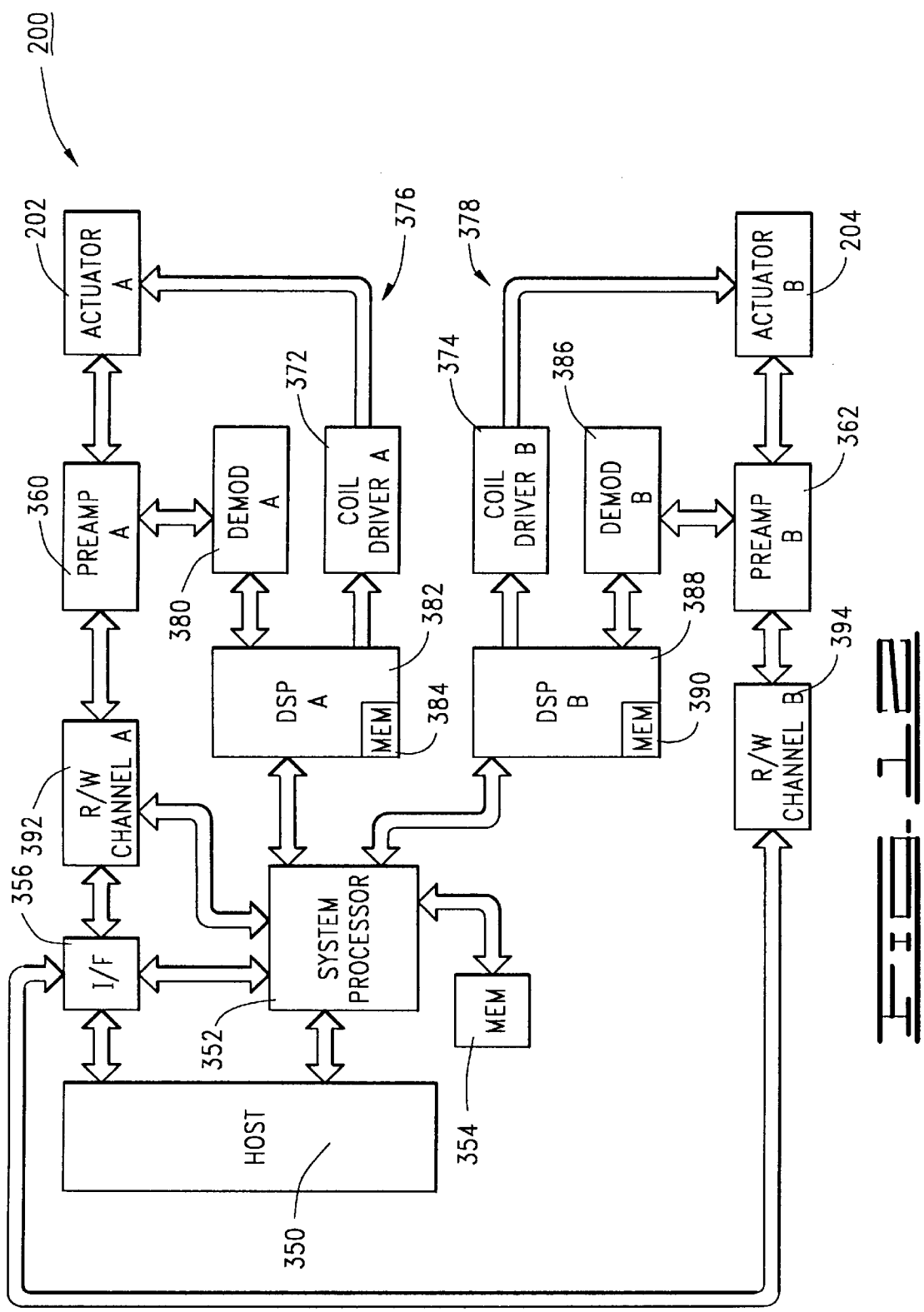

DUAL DISC DRIVE ACTUATOR ASSEMBLY FABRICATION

RELATED APPLICATIONS

This application claims priority to Provisional Application No. 60/075,323 entitled ATTACHING DUAL ACTUATORS ON A COMMON PIVOT, filed Feb. 20, 1998.

FIELD OF THE INVENTION

This invention relates generally to the field of disc drive storage devices, and more particularly, but not by way of limitation, to a method for fabricating a dual actuator assembly for use in a disc drive to improve data transfer performance, the dual actuator assembly having a pair of axially aligned actuator assemblies mounted for independent rotation about a common axis.

BACKGROUND OF THE INVENTION

A disc drive is a digital data storage device which enables a user of a computer system to store and retrieve large amounts of data in a fast and efficient manner. Disc drives of the present generation have data storage capacities in excess of several gigabytes (GB) and can transfer data at sustained rates of several megabytes (MB) per second.

A typical disc drive is provided with a plurality of magnetic recording discs which are mounted to a rotatable hub of a spindle motor for rotation at a constant, high speed. An array of read/write heads is disposed adjacent surfaces of the discs to transfer data between the discs and a host computer. The heads are radially positioned over the discs by a rotary actuator assembly and a closed loop, digital servo system, and are caused to fly proximate the surfaces of the discs upon air bearings established by air currents set up by the high speed rotation of the discs.

A plurality of nominally concentric tracks are defined on each disc surface, with disc drives of the present generation having track densities in excess of 4,000 tracks per centimeter (10,000 tracks per inch). A preamp and driver circuit generates write currents that are used by the head to selectively magnetize the tracks during a data write operation and amplify read signals detected by the head during a data read operation. A read/write channel and interface circuit are operably connected to the preamp and driver circuit to transfer the data between the discs and the host computer.

The servo system operates in two primary modes: seeking and track following. During a seek, a selected head is moved from an initial track to a destination track on the corresponding disc surface using a velocity-control approach. The servo system initially determines a velocity profile indicative of the velocity trajectory the head should take based upon the length of the seek (in terms of tracks to go to the destination track). The servo system next applies current to an actuator coil to first accelerate and then decelerate the head toward the destination track in accordance with the velocity profile.

During the seek, the servo system sequentially measures (estimates) the actual velocity of the head and adjusts the current in relation to velocity error (i.e., the difference between the actual velocity and the target velocity as set forth by the velocity profile). As the head approaches the destination track, the servo system initiates a settle mode to bring the head to rest over the destination track within a selected settle threshold as a percentage of the track width, such as ±10% of track center. Thereafter, the servo system enters the track following mode wherein the head is nominally maintained over the center of the destination track until the next seek is performed.

As will be recognized, a disc drive is primarily utilized to transfer data between the tracks of the discs and the host computer. Such data transfer operations usually cannot occur during a seek, but rather require the drive to be in track following mode. Hence, to maximize disc drive data transfer rate capabilities, high performance disc drives are designed to achieve minimum average seek times. Typical drives of the present generation have nominal seek times on the order of eight milliseconds (msec), facilitating minimum sustained data transfer rates on the order of 20 MB/sec. It will be recognized that achieving a high as practicable minimum sustained data transfer rate is particularly important in sustaining data transfer operations, such as audio-video (AV) and communications applications.

In an effort to increase data transfer performance, designers of disc drives have in the past proposed various approaches which have met with greater or lesser amounts of commercial success. One particularly useful advancement in the art is zone based recording (ZBR) such as exemplified by U.S. Pat. No. 4,799,112 issued Jan. 17, 1989 to Bremmer et al., assigned to the assignee of the present invention. As will be recognized by those skilled in the art, ZBR generally entails defining a plurality of essentially constant bit-density zones across the radii of the discs, so that all of the tracks in each zone have the same number of data blocks (sectors) in which user data are stored. Thus, the number of data blocks per track increases in a step-wise fashion from the inner diameter (ID) to the outer diameter (OD) of the discs. The use of ZBR results in a disc drive transfer rate that varies with radius, with the transfer rate about doubling for tracks at the OD as compared to tracks at the ID.

Another advancement in the art is the use of multiple heads to access the same data surfaces on the discs. As exemplified by U.S. Pat. No. 5,218,496 issued Jun. 8, 1993 to Kaczeus, a head actuator structure is provided having pairs of heads which are angularly offset around each of the corresponding disc surfaces. U.S. Pat. No. 5,343,345 issued Aug. 30, 1994 to Gilovich also proposes a pair of read heads per disc surface, including both single actuator and dual actuator arrangements, with the dual actuators arranged on opposite sides of the disc stack.

Yet another advancement in the art is the use of a plurality of drives in a multi-drive array, sometimes referred to as a RAID ("Redundant Array of Inexpensive Discs"; also "Redundant Array of Independent Discs"). The array operates substantially as a single, large disc drive device. The primary impetus behind the development of such multi-drive arrays is the disparity between central processing unit (CPU) speeds which continue to increase at a phenomenal rate bounded primarily by electronic constraints, and disc drive input/output (I/O) speeds which are bounded largely by mechanical constraints. As will be recognized, an array of smaller, inexpensive drives functioning as a single storage device has been usually found to provide improved operational performance over a single, expensive drive. A seminal article proposing various RAID architectures was published in 1987 by Patterson et al., entitled "A Case for Redundant Arrays of Inexpensive Discs (RAID)", Report No. UCB/CSD 87/391, Dec. 1987, Computer Science Division (EECS), University of California, Berkeley, Calif.

RAID architectures are presently identified by numerical levels of organization, with each level providing different data integrity and I/O throughput characteristics. The particular level (or levels) used in a given application largely depend upon the requirements of the application, with commonly utilized RAID levels ranging from RAID 0 to RAID 7. However, a generally common characteristic of all RAIDs is that data transfer characteristics are enhanced over that of a single disc drive through striping data (i.e., storing portions of the data) across multiple drives in the array.

While these and other well known advancements in the art have allowed system designers to facilitate ever greater levels of disc drive data transfer performance, there remains a continual need for further improvements which enhance the minimum data transfer rate achievable by a disc drive. It is to this and other related ends that the present invention is directed.

SUMMARY OF THE INVENTION

The present invention provides a method for fabricating a dual actuator assembly for use in a disc drive.

As exemplified by presently preferred embodiments, the disc drive accommodating the dual actuator assembly is provided with a plurality of rotatable discs which are axially aligned for rotation, the discs being further divided into first and second sets of adjacently disposed discs. In a preferred embodiment, the disc drive is provided with a total of ten discs, with the top five discs constituting the first set and the bottom five discs constituting the second set.

A dual actuator assembly is disposed adjacent the discs having a first actuator assembly which is mounted for rotation about a common axis and supports a plurality of read/write heads over corresponding recording surfaces of the first set of discs. The dual actuator assembly further has a second actuator assembly which is adjacent the first actuator assembly, mounted for rotation about the common axis, and supports a plurality of read/write heads over corresponding recording surfaces of the second set of discs.

The first and second actuator assemblies are independently rotatable about the common axis, facilitating improved data transfer performance by allowing use of one of the actuator assemblies to transfer data while the other actuator assembly is positioned for subsequent data transfer.

In accordance with a preferred method of fabrication for the dual actuator assembly, a dual bearing cartridge assembly is provided with a stationary shaft aligned along the common axis having first and second ends, a first rotatable sleeve mounted for rotation about the stationary shaft toward the first end, a second rotatable sleeve mounted for rotation about the stationary shaft toward the second end, and first and second bearing assemblies supporting the first and second rotatable sleeves, respectively.

A support member is inserted between the first and second rotatable sleeves to reduce preload of the first and second bearing assemblies, allowing attachment of the first and second actuator assemblies to the first and second rotatable sleeves, respectively while preventing damage to the bearing assemblies. The support member has a pair of support arms each having a circumferentially extending wedge so that, when the support arms are urged in a plane orthogonal to the common axis, the wedges exert a separating force upon the first and second rotatable sleeves to reduce the preload of the first and second bearing assemblies.

These and various other features as well as advantages which characterize the present invention will be apparent from a reading of the following detailed description and a review of the associated drawings.

BRIEF DESCRIPTION OF THE DRAWINGS

FIG. 2 provides a side, elevational partial-cross sectional view of a disc drive having dual, independently rotatable actuator assemblies ("top" and "bottom" actuator assemblies) mounted for rotation about a common axis in accordance with a preferred embodiment of the present invention.

FIG. 3 is an end, elevational view of a magnetic assembly of the disc drive of FIG. 2 constructed in accordance with a preferred embodiment.

FIG. 4 is an end, elevational view of another magnetic assembly of the disc drive of FIG. 2 constructed in accordance with another preferred embodiment.

FIG. 5 shows an elevational cross-sectional view of a dual bearing cartridge assembly of the disc drive of FIG. 2 which axially aligns and facilitates independent rotational movement of the dual actuator assemblies of FIG. 2.

FIG. 6 shows a portion of the dual bearing cartridge assembly of FIG. 5, illustrating in greater detail the use of a selected one of the tolerance rings of FIG. 5 in the mounting of the top actuator assembly relative to the top outer sleeve of the dual bearing cartridge assembly of FIG. 5 in accordance with a preferred embodiment.

FIG. 11 is a functional block diagram of an alternative preferred embodiment of the disc drive of FIG. 2, showing a dual servo circuit and single read/write channel arrangement.

FIG. 12 is a functional block diagram of yet another alternative preferred embodiment of the disc drive of FIG. 2, showing a dual servo circuit and dual read/write channel arrangement.

FIG. 13 is a generalized flow chart for a MULTI-TRACK DATA TRANSFER USING DUAL ACTUATOR ASSEMBLIES routine, illustrating preferred steps in the high speed, continuous transfer of data between the disc drive of FIG. 2 and a host computer in which the disc drive is mountable.

DETAILED DESCRIPTION

Figure 1:
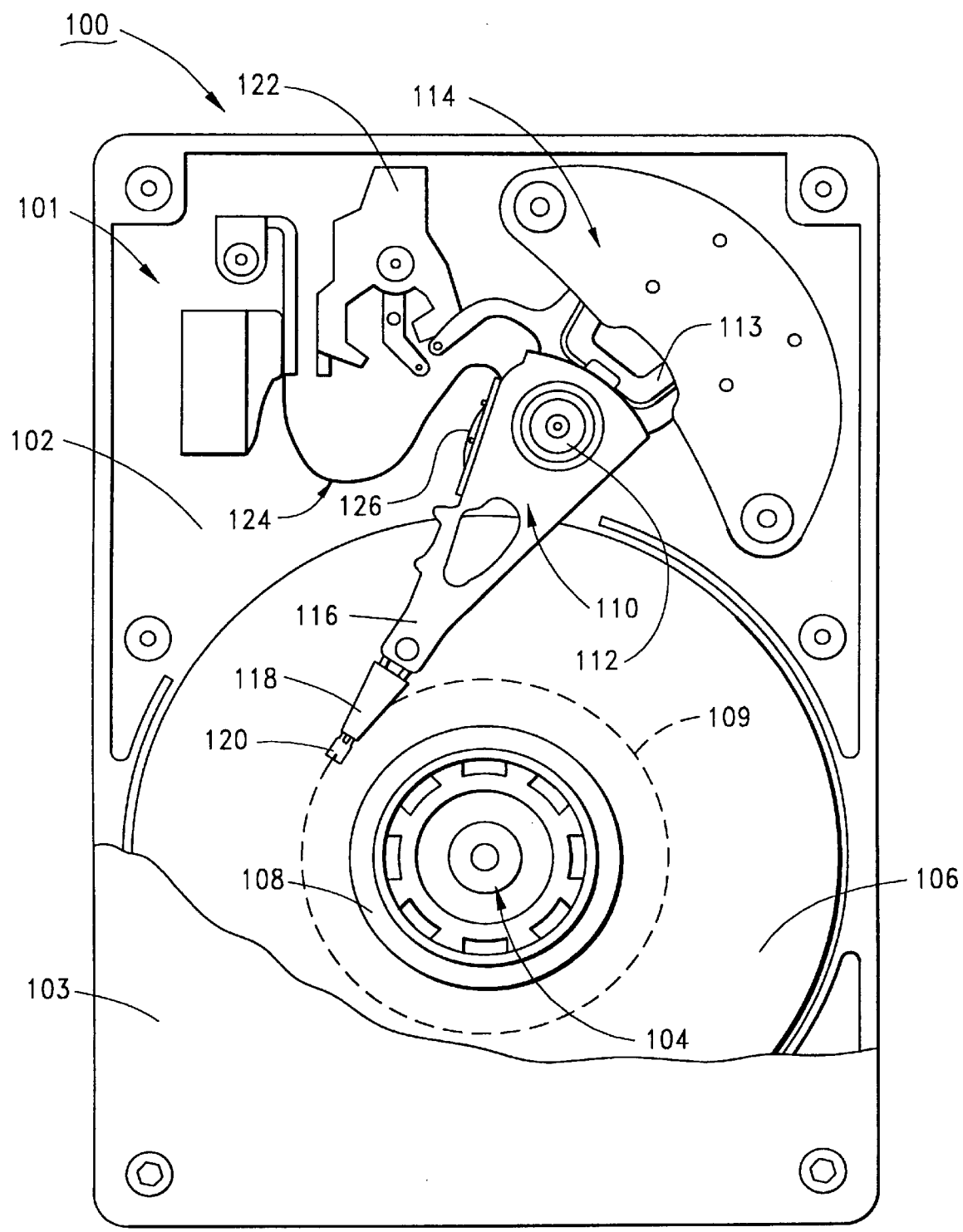
FIG. 1 shows a top plan view of a prior art disc drive which has been provided to set forth various basic components of a typical disc drive in order to better illustrate presently preferred embodiments of the present invention.

In order to set forth preferred embodiments of the present invention, the present discussion will begin with FIG. 1 which shows a top plan representation of a typical prior art disc drive denoted generally at 100. It will be understood that the prior art disc drive 100 has been provided to show various components typically found in a disc drive and to facilitate the subsequent discussion of various preferred embodiments of the present invention.

With reference to FIG. 1, the prior art disc drive is contemplated as comprising two main assemblies: a head-disc assembly (HDA) 101, and a printed wiring assembly (PWA) which is mounted to the underside of the HDA and thus not visible in FIG. 1. As will be recognized, the HDA 101 generally houses mechanical portions of the disc drive 100 and the PWA houses electronics used to control the HDA 101 and communicate with a host computer (not shown) in which the disc drive 100 is mountable.

A top cover 103, shown in partial cut-back fashion to reveal selected components of interest, mates with a base deck 102 of the HDA 101 in order to provide a clean internal environment for the HDA 101. A spindle motor (generally designated at 104) is supported by the base deck 102 and rotates a plurality of discs 106 at a constant high speed. A disc clamp 108 secures the discs 106 to the spindle motor 104.

Each disc 106 includes a plurality of nominally concentric tracks (one of which is represented by dashed circle 109) to which user data are written by way of a rotary actuator assembly 110, which rotates about a bearing cartridge assembly 112 in response to the application of current to a coil (113, a portion of which is visible in FIG. 1) of a voice coil motor (VCM) 114. A plurality of rigid arms 116 extend from the actuator assembly 110, each of which supports a corresponding flexible suspension assembly 118. A plurality of heads 120 are supported by the suspension assemblies 118 over the recording surfaces of the discs 106 by an air bearing established by air currents set up by the high speed rotation of the discs 106. The heads 120 are preferably characterized as magneto-resistive (MR) heads.

A latch assembly 122 secures the actuator assembly 110 when the disc drive 100 is deactivated and a flex circuit assembly 124 allows communication between the actuator assembly 110 and the disc drive PWA, both in a conventional manner. The flex circuit assembly 124 includes a preamplifier/drive circuit 126 ("preamp") which applies write currents to the heads 120 during a write operation and applies read bias currents to the heads to detect the selective magnetization of the discs and outputs a read signal during a read operation.

Referring now to FIG. 2, shown therein is a side, elevational partial-cross sectional view of a disc drive 200 constructed in accordance with a preferred embodiment of the present invention. As will be discussed in greater detail hereinbelow, the disc drive 200 includes dual, independently rotatable actuator assemblies 202 and 204 which are mounted for rotation about a common axis (indicated by dotted line 206). For purposes of convenience, the actuator assembly 202 will be also hereinafter referred to as the "top actuator assembly" and the actuator assembly 204 will be also hereinafter referred to as the "bottom actuator assembly." Moreover, various substantially similar components shown in FIG. 1 will be similarly identified with the same reference numerals in FIGS. 2 et seq.

From a review of FIG. 2 it will be recognized that a total of 10 discs (separately numerically designated from top to bottom as 208, 210, 212, 214, 216, 218, 220, 222, 224 and 226) are axially aligned for rotation by a spindle motor (not shown in FIG. 2, but substantially identical to the spindle motor 104 discussed above with respect to FIG. 1). Of course, the present invention as claimed below can be practiced with another number of discs, as desired.

The top actuator assembly 202 is utilized to access data recording surfaces of the top five discs 208, 210, 212, 214 and 216 (hereinafter also referred to as a "first set" of discs), and the bottom actuator assembly 204 is correspondingly utilized to access data recording surfaces of the bottom five discs 218, 220, 222, 224 and 226 (hereinafter also referred to as a "second set" of discs). That is, a plurality of nominally concentric tracks are defined on each of the recording surfaces similar to the track 109 shown in FIG. 1. It will be noted that, as with the prior art disc drive 100 of FIG. 1, the disc drive 200 of FIG. 2 shows actuator arms 116 which extend from the actuator assemblies 202, 204 over the corresponding discs 208, 210, 212, 214, 216, 218, 220, 222, 224 and 226. It will be understood, however, that corresponding flexures (118 in FIG. 1) and heads (120 in FIG. 1) have been omitted from FIG. 2 to simplify the present discussion.

A disc spacer (not shown) of selected height can be used to achieve the desired axial distance between the fifth and sixth discs 216, 218 in the stack of discs to allow access by both of the actuator assemblies 202, 204 between these discs. Although not shown in FIG. 2, it will be understood that corresponding flex circuits (similar to 124 in FIG. 1) are used to provide electrical comnmunication between the dual actuator assemblies 202, 204 and a disc drive PWA contemplated as being mounted to the base deck 102. Further, corresponding limit stops and latching features (such as 122 in FIG. 1) are provided to limit the rotational travel of the actuator assemblies 202, 204 and to park the actuator assemblies 202, 204 during non-operational periods. These limit stops and latching features can be any of several well known, conventional configurations that are presently used to limit the rotational travel and latch single actuator assemblies in the prior art, and as such have not been shown with particularity in the drawings.

Continuing with FIG. 2, a dual voice coil motor (VCM) is generally denoted at 228 and comprises a magnetic assembly 230 which interacts with top and bottom coils 232, 234 of the actuator assemblies 202, 204. More particularly, the top and bottom coils 232, 234 are rigidly attached to the respective top and bottom actuator assemblies 202, 204 for immersion in a magnetic field established by the magnetic assembly 230. In a preferred embodiment, the magnetic assembly 230 comprises top, intermediate and bottom magnetically permeable pole pieces 236, 238 and 240 respectively, each having a general shape as shown for the VCM 114 of FIG. 1. The magnetic assembly 230 further preferably comprises permanent magnets 242, 244, 246 and 248 which are rigidly attached to the corresponding pole pieces 236, 238 and 240.

Referring to FIG. 3, shown therein is an end, elevational view of the magnetic assembly 230 of FIG. 2 constructed in accordance with a preferred embodiment. For clarity, the view shown in FIG. 3 is generally that as would be seen along view 3—3 of FIG. 2.

With regard to FIG. 3, the magnetic assembly 230 further comprises stand-offs 250 arranged to support the magnetic assembly 230 in the desired spatial relationship shown therein. Similar to conventional practices, the stand-offs 250 preferably comprise hollow cylindrical members through which suitable fasteners (not shown) extend to suspend the intermediate pole piece 238 and the permanent magnets 244, 246. For reference, flux lines 252 have been provided to generally represent the magnetic field established by the magnetic assembly 230, with this magnetic field utilized by the coils 232, 234 to independently rotate the top and bottom actuator assemblies 202, 204 in relation to the independent application of current to the coils 242, 244. Except for the novel arrangement shown in FIG. 3, it will be recognized that the pole pieces 236, 238, 240, the permanent magnets 242, 244, 246, 248 and the stand-offs 250 are otherwise of generally conventional construction.

With reference to FIG. 4, shown therein is an end, elevational view of another magnetic assembly of the disc drive of FIG. 2 constructed in accordance with a preferred embodiment and generally denoted at 260. The alternative magnetic assembly 260 of FIG. 4 is generally similar to the magnetic assembly 230 of FIG. 3, except that a single large intermediate permanent magnet 262 is shown disposed between the coils 232, 234, instead of the intermediate pole piece 238 and permanent magnets 244, 246 of FIG. 3. The intermediate permanent magnet 262 of FIG. 4 is shown to be supported by support members 264, which in turn are attached to a pair of stand-offs 266 which extend from the top pole piece 236 to the bottom pole piece 240. The support members 264 can be of any suitable construction; in a preferred embodiment the support members 264 comprise an overmolded polymeric material.

Referring now to FIG. 5, shown therein is an elevational cross-sectional view of a preferred construction for a dual bearing cartridge assembly 270 of the disc drive of FIG. 2. The dual bearing cartridge assembly 270 axially aligns and supports the dual actuator assemblies 202, 204 for independent rotational movement about the common axis 206.

The dual bearing cartridge assembly 270 includes a stationary shaft 272 and top and bottom outer sleeves 274, 276 which are supported relative to the stationary shaft by ball bearing assemblies 278, 280, 282, 284. The bearing assemblies 278, 280, 282, 284 are preferably press-fit onto the stationary shaft 272. Particularly, inner races (not separately shown) of the intermediate bearing assemblies 280, 282 are brought into contact with a circumferentially extending step 285 of the stationary shaft 272, the step 285 maintaining a desired spatial relationship between the top and bottom actuator assemblies 202, 204 (portions of which are represented in FIG. 5).

Continuing with FIG. 5, the stationary shaft 272 has openings 286 on both ends to receive fasteners (not shown) for attachment of the stationary shaft to the base deck 102 and the top cover 103. In a preferred embodiment, the openings 286 are internally threaded to receive screw members. In this manner it will be understood that the stationary shaft 272 is rigidly supported by the base deck 102 and the top cover 103 and the top and bottom outer sleeves 274, 276 rotate thereabout.

The top and bottom outer sleeves 274, 276 each form respective shoulders 288, 290, 292, 294. Grooves 296, 298 of reduced diameter are disposed between adjacent pairs of shoulders 288, 290 and 292, 294 to accommodate tolerance rings 300, 302. The tolerance rings 300, 302 are of a type such as are manufactured by RENCOL, the Ray Engineering Company, of Great Britain. The tolerance rings 300, 302 bear upon the corresponding top and bottom actuator assemblies 202, 204 to maintain the desired axial relationships between the actuator assemblies 202, 204 and the outer sleeves 274, 276. Preferably, each of the tolerance rings 300, 302 comprises a split ring with a number of radially extending corrugations which contact the actuator assemblies 202, 204, as shown in FIG. 5.

FIG. 6 shows a portion of the dual bearing cartridge assembly 270 of FIG. 5, illustrating in greater detail the use of the tolerance ring 300 in the mounting of the top actuator assembly 202 relative to the top outer sleeve 274.

Figure 7:
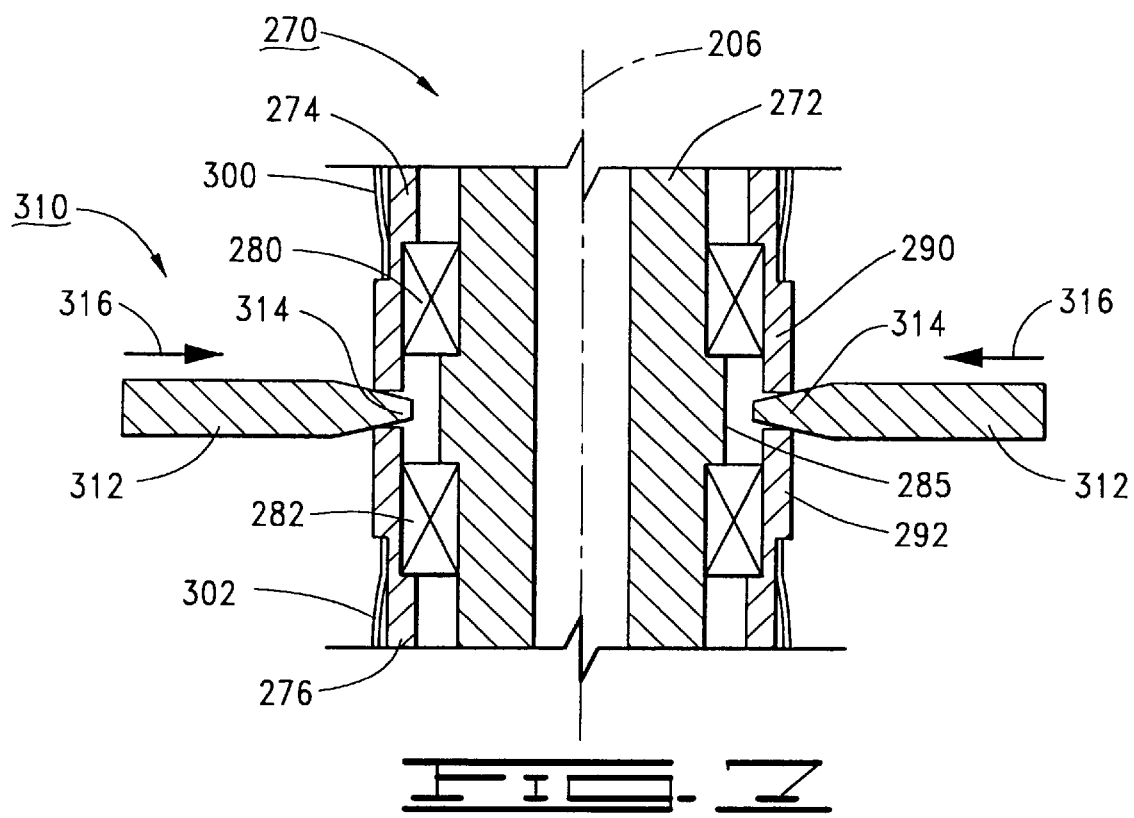
FIG. 7 is an elevational, cross-sectional view of a portion of the dual bearing cartridge assembly of FIGS. 5 and 6 in combination with suitable tooling which can be advantageously used during assembly of the dual actuator assembly arrangement of FIG. 2, the tooling supporting outer races of bearings of the bearing cartridge assembly to prevent damage to the bearings.

Referring now to FIG. 7, shown therein is an elevational, cross-sectional view of a portion of the dual bearing cartridge assembly 270 of FIGS. 5 and 6 in combination with suitable tooling (generally denoted at 310 and also hereinafter referred to as a "support member") which can be advantageously used during assembly of the dual actuator assemblies 202, 204 onto the dual bearing cartridge assembly 270 of FIG. 5.

Figure 8:
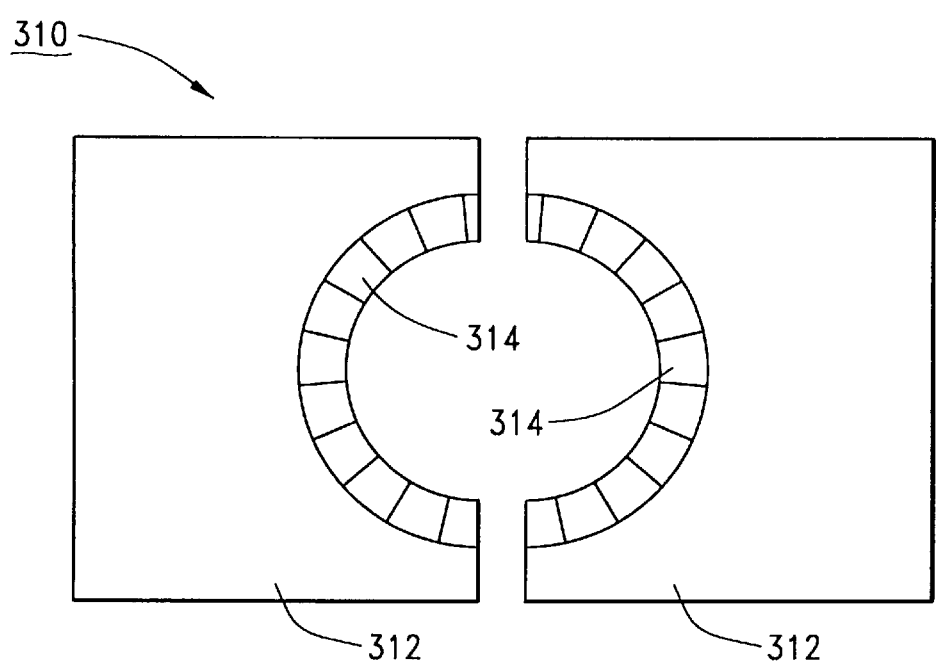
FIG. 8 is a top plan representation of the tooling of FIG. 7.

The tooling 310 preferably comprises a pair of support arms 312, shown more particularly in FIG. 8, which are used to support outer races (not separately shown in the drawings) of the intermediate bearing assemblies 280, 282. That is, the support arms provides a force in opposition to the preload of the bearing assemblies while the actuator assemblies 202, 204 are press-fit over the corresponding outer sleeves 274, 276 and tolerance rings 300, 302, thereby preventing damage to the bearing assemblies during assembly and ensuring proper alignment of the various constituent components of the final assembly.

As can be seen from FIGS. 7 and 8, the support arms 312 are provided with circumferentially extending wedges 314 which, when inserted between the adjacent outer sleeves 274, 276 in directions indicated by arrows 316, support the adjacent outer sleeves 274, 276 to oppose the preload forces on the intermediate bearing assemblies 280, 282. Force sensors (not shown) can be advantageously used to monitor the amount of force applied to the outer sleeves 274, 276 by the support arms 312, as desired, to control the displacement of the support arm 312 to provide a selected supporting force.

Figure 9:
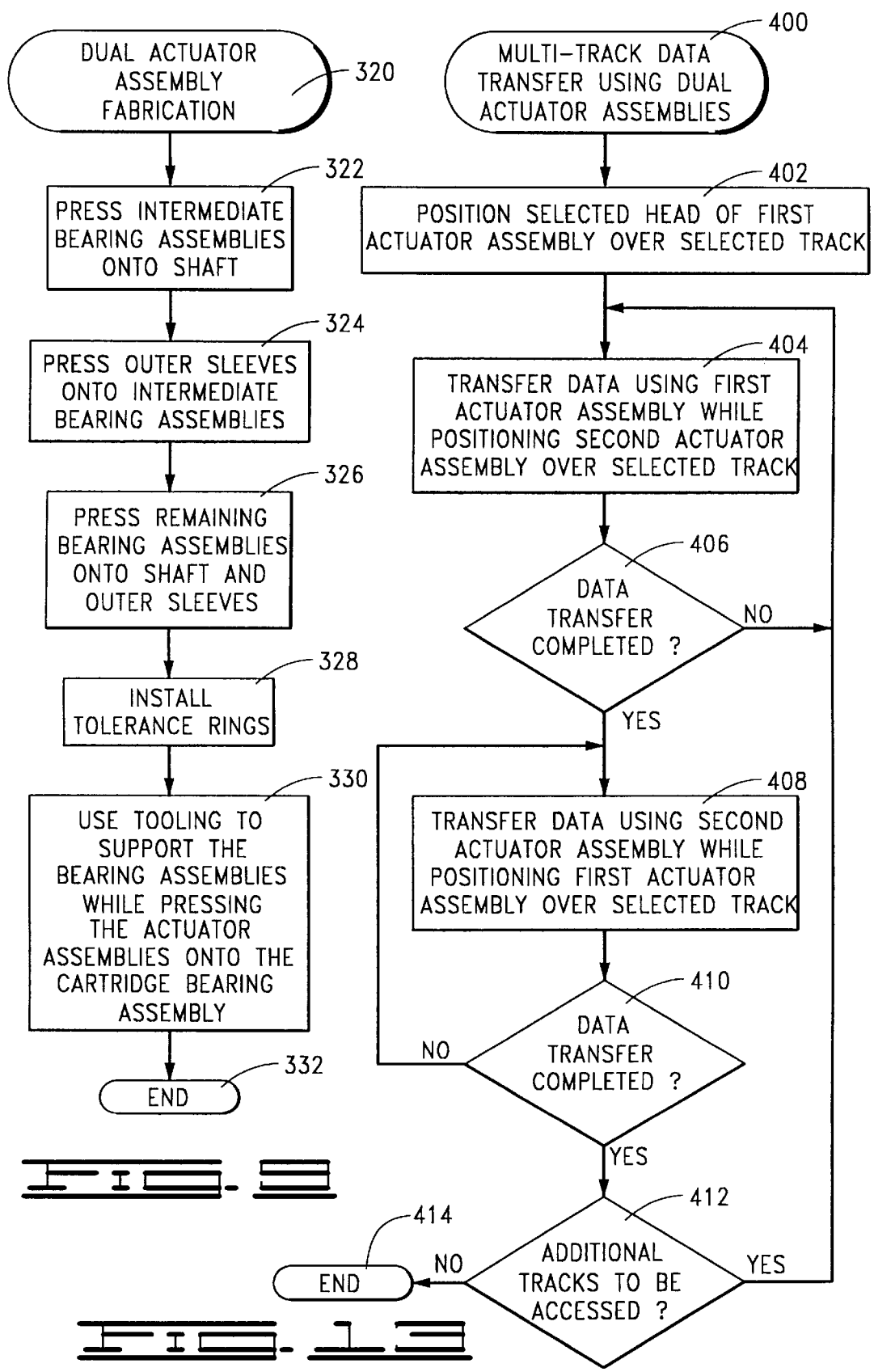
FIG. 9 is a generalized flow chart for a DUAL ACTUATOR ASSEMBLY FABRICATION routine, illustrating preferred steps for the fabrication of the dual actuator assembly configuration of FIG. 2.

To set forth the steps that are preferably performed to assemble the dual actuator assemblies 202, 204 in a final arrangement as shown in FIG. 2, FIG. 9 has been provided which illustrates a generalized flow chart for a DUAL ACTUATOR ASSEMBLY FABRICATION routine 320. It will be readily understood that other similar methodologies can be used to fabricate the dual actuator assembly shown in FIG. 2.

As shown at step 322 of FIG. 9, the intermediate bearings (280, 282 of FIG. 5) are first pressed onto the stationary shaft 272 so that the inner races of the intermediate bearings abut the circumferentially extending step 285. Next, as shown by step 324 of FIG. 9, the respective top and bottom outer sleeves 274, 276 are pressed onto the intermediate bearings, with care being taken to support the outer races of the intermediate bearings to prevent damage during assembly.

The remaining top and bottom bearing assemblies 278, 284 are next pressed between the stationary shaft 272 and the respective outer sleeves 274, 276, as shown by step 326, and the tolerance rings 300, 302 are installed onto the corresponding grooves 296, 298, as shown by step 328.

Finally, the actuator assemblies 202, 204 are pressed onto the respective outer sleeves 274, 276 and tolerance rings 300, 302 at step 330, utilizing the tooling 310 of FIGS. 7 and 8 to support the intermediate bearing assemblies 280, 282 in accordance with the foregoing discussion. The routine thereafter ends at 332. Once assembled, the completed assembly is subsequently installed into the disc drive 200 in the final arrangement of FIG. 2.

Having now discussed in particular detail the construction of the dual actuator assemblies 202, 204 in accordance with various preferred embodiments, the manner in which data are transferred between the disc drive 200 and a host computer in which the disc drive 200 is mounted will now be addressed. Initially, although the present invention as claimed hereinbelow presents a novel disc drive structure with independently rotatable actuator assemblies (202, 204), in general multi-actuator and multi-head applications have been previously proposed in the art, such as exemplified by the aforementioned U.S. Pat. No. 5,218,496 and U.S. Pat. No. 5,343,345. Accordingly, it is contemplated that those skilled in the art can readily adapt existing servo and read/write channel circuitry to implement the dual actuator assemblies 202, 204. Nevertheless, for purposes of providing a complete disclosure of preferred methodologies for the transfer of data between the disc drive 200 and a host computer, FIGS. 10–12 have been provided to illustrate various contemplated arrangements of control circuitry for the disc drive 200.

Figure 10:
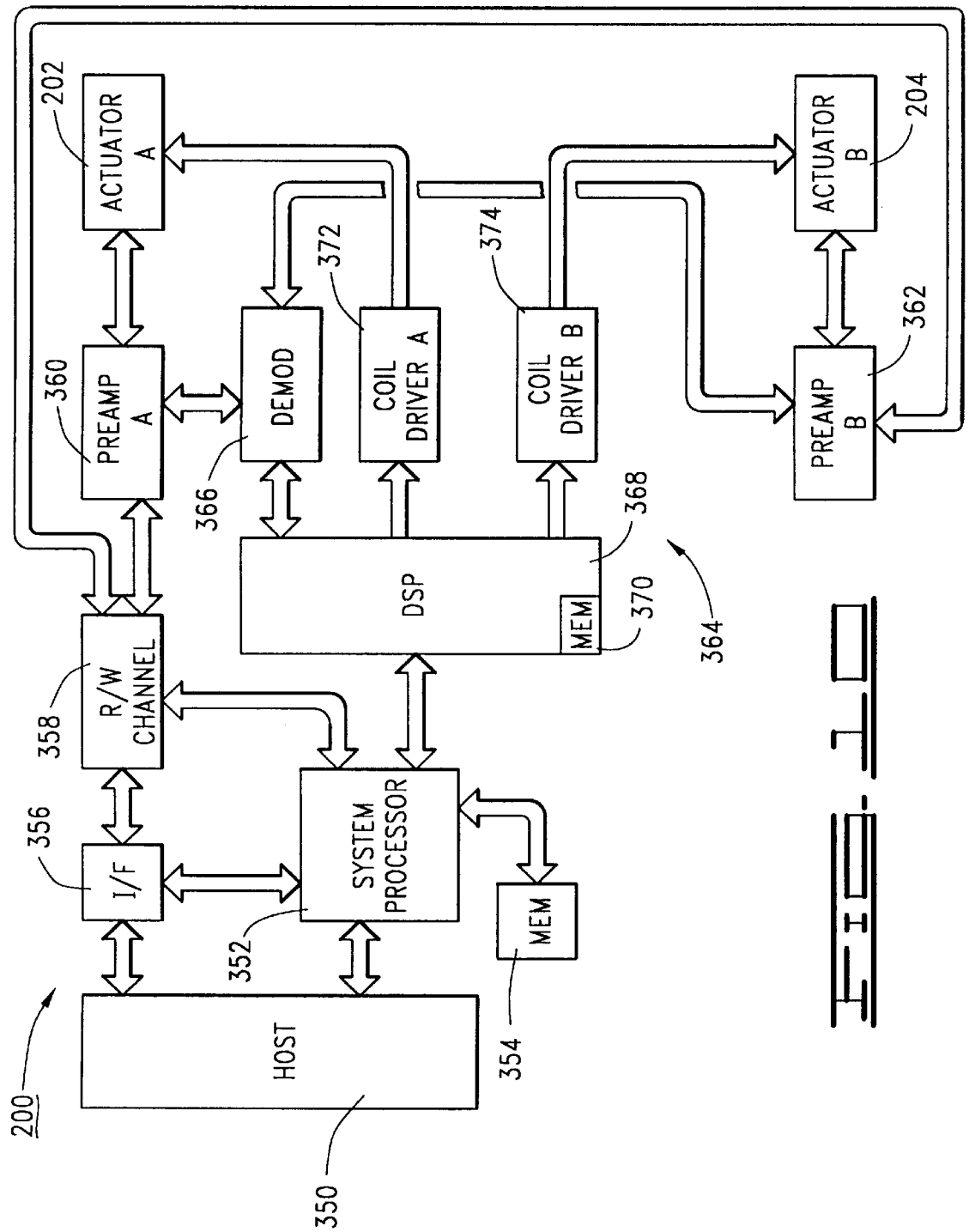
FIG. 10 is a functional block diagram of a preferred embodiment of the disc drive of FIG. 2, showing a single servo circuit and single read/write channel arrangement.

Beginning with FIG. 10, shown therein is a functional block diagram of a preferred embodiment of the electronic control circuitry of the disc drive 200. As explained below, the diagram of FIG. 10 presents a single read/write channel, single servo circuit configuration.

The disc drive 200 is contemplated as being mounted in a host computer (shown generally at 350) and includes a system processor 352 which provides top level control of the operation of the disc drive 200. Programming and parameter values utilized by the system processor 352 are stored in processor memory 354 (MEM), which preferably comprises both volatile and non-volatile memory devices such as dynamic random access memory (DRAM) and flash memory. An interface circuit 356 includes a data buffer (not separately shown) for the temporary buffering of transferred data, and a sequencer (also not separately shown) which directs the operation of the disc drive 200 during data transfer operations.

During a data write operation, the interface circuit 356 buffers and passes input data to a read/write channel 358, which encodes the data with run-length limited (RLL) and error correction codes (ECC). For write operations involving the first set of discs 208, 210, 212, 214 and 216 (FIG. 2), the encoded data are passed to a first preamplifier/driver circuit 360 ("preamp A") which is preferably mounted to the side of the top actuator assembly 202 ("actuator A") in a manner similarly to that set forth for the preamp 126 of the prior art disc drive 100 of FIG. 1. In response, the preamp A (360) applies write currents to the appropriate head in order to selectively magnetize the corresponding disc. In like manner, for write operations involving the second set of discs 218, 220, 222, 224 and 226 (FIG. 2), the encoded data are passed to a second preamplifier/driver circuit 362 ("preamp B") which is preferably mounted to the side of the bottom actuator assembly 204 ("actuator B"). In response, the preamp B (362) applies write current to the appropriate head to selectively magnetize the corresponding disc.

During a data read operation wherein previously stored data are retrieved from the discs 208, 210, 212, 214, 216, 218, 220, 222, 224 and 226, the associated preamp A or preamp B (360 or 362) applies a read bias current to the corresponding head and monitors the voltage across a magneto-resistive (MR) element of the head, the voltage varying with respect to the selective magnetization of the disc. The detected voltage is preamplified by the associated preamp to provide an amplified read signal to the read/write channel 358, which decodes the stored data and provides the same to the buffer of the interface circuit 356 for subsequent transfer to the host computer 350.

Continuing with FIG. 10, a servo circuit (denoted generally at 364) controls the radial positions of the top and bottom actuator assemblies 202, 204 in response to servo information embedded on and read from the respective discs 208, 210, 212, 214, 216 and 218, 220, 222, 224, 226. The servo information is passed to the servo circuit 364 by way of the respective preamps 360, 362.

The servo circuit 364 of FIG. 10 includes a demodulator (demod) 366 which conditions the servo information for use by a single digital signal processor (DSP) 368 having associated programming in memory (MEM) 370. In response to the servo information as well as commands from the system processor 352, the DSP 368 provides a current command signal to either a coil driver A (372) or a coil driver B (374), depending upon whether the servo system is controllably positioning actuator A (202) or actuator B (204). The current command signal causes the respective coil driver (372, 374) to output current to the respective coil (232, 234 of FIG. 2) in order to position the heads relative to the corresponding discs.

The servo circuit 364 operates in two primary, selectable modes: seeking and track following. During a seek, a selected head is moved from an initial track to a destination track through the initial acceleration and subsequent deceleration of the head toward the destination track. Once the selected head has been settled onto the destination track, the servo circuit 364 operates in the track following mode, using the servo information to maintain the head over the destination track. For a more detailed discussion of general servo operation, see U.S. Pat. No. 5,262,907 issued Nov. 16, 1993 to Duffy et al., assigned to the assignee of the present invention. It is contemplated that the servo circuit 364 will have sufficient bandwidth to carry out requisite seek operations with one of the actuator assemblies 202, 204 and to perform track following operations with the remaining one of the actuator assemblies 202, 204 (and to simultaneously carry out track following modes of operation for both actuator assemblies 202, 204).

It will be recognized that the single servo circuit (364) and single read/write channel (358) configuration of FIG. 10 is a relatively low cost solution. However, an alternative configuration for the disc drive 200 is set forth by FIG. 11, which utilizes a dual servo circuit, single read/write channel approach. To simplify the following discussion, similar circuits set forth in FIG. 10 are identified in FIGS. 11 and 12 using the same reference numerals.

The diagram of FIG. 11 operates in a manner substantially similar to that of FIG. 10, except that each of the actuator assemblies 202, 204 has its own associated servo circuit, denoted generally at 376 and 378, respectively. More particularly, the servo circuit 376 includes a first demodulator 380 ("demod A") and a first DSP 382 ("DSP A") with associated memory 384 ("MEM"); the servo circuit 378 includes a second demodulator 386 ("demod B") and a second DSP 388 ("DSP B") with associated memory 390 ("MEM").

As will be appreciated, the use of two servo circuits 376, 378 will generally allow each of the associated DSPs 382, 388 to provide improved servo performance, as each of the DSPs 382, 388 is dedicated to positional control of the corresponding actuator assemblies 202, 204. Thus, the configuration of FIG. 11 could be somewhat easier to implement by using similar programming for each of the DSPs 382, 388 as found in conventional disc drives, such as 100 of FIG. 1. However, it will be further appreciated that the configuration of FIG. 11 will generally require a greater cost due to the additional circuits required to implement the configuration.

Turning now to FIG. 12, shown therein is yet another alternative configuration for the disc drive 200, utilizing a dual servo circuit, dual read/write channel approach. As shown in FIG. 12, the disc drive 200 is contemplated in this example to comprising the dual servo circuits 376, 378 previously discussed in FIG. 11, as well as first and second read/write channels 392, 394 ("R/W channel A" and "R/W channel B," respectively). Thus, the configuration of FIG. 12 can accommodate simultaneous writing and reading operations using both of the actuator assemblies 202, 204, but at an increased cost due to the dual read/write channels 392, 394.

From the foregoing discussion of FIGS. 10–12, it will be recognized that one important advantage of the dual actuator assembly configuration of the disc drive 200 is the capability of improving data transfer rate performance through minimizing head switch times (i.e., delays associated with data transfer operations between tracks on different discs) and seek times (i.e., time required to move a given head from an initial track to a destination track on the corresponding recording surface). Further, the configuration of FIG. 12 readily facilitates the simultaneous transfer of data to multiple discs.

By way of illustration, a high speed data transfer operation (either reading or writing) can be sustained by using one of the actuator assemblies 202, 204 to transfer data while the remaining one of the actuator assemblies 202, 204 is positioned over the next track to be accessed. In this way, the continuous reading or writing of data can be alternatively switched between tracks associated with the top set of discs 208, 210, 212, 214, 216 and tracks associated with the bottom set of discs 218, 220, 222, 224, 226.

Such operation is summarized by FIG. 13, which provides a simplified flow chart for a MULTI-TRACK DATA TRANSFER USING DUAL ACTUATOR ASSEMBLIES routine 400, representative of top level programming utilized by the system processor 352 to control the disc drive 200. As shown in step 402 of FIG. 13, the routine first positions a selected head of a first one of the actuator assemblies 202, 204 over a corresponding, selected track to or from which the data are to be transferred.

Once so positioned, the routine continues at step 404 wherein the data are transferred to or from the selected track while the disc drive 200 operates to position a second one of the actuator assemblies 202, 204 over a second selected track with which the data are to be subsequently transferred.

At such time that the data transfer operation associated with the first selected track of step 402 is completed, as indicated by decision step 406, the routine continues to step 408 wherein a next portion of the data are transferred to the second selected track. During step 408, the disc drive 200 further operates to position the next selected head of the first one of the actuator assemblies 202, 204 over a next selected track. In this manner, decision steps 410 and 412 operate to continue the alternating transfer of data using one of the actuator assemblies 202, 204 and the corresponding positioning of the remaining one of the actuator assemblies 202, 204 until the data transfer operation is completed, at which point the routine ends at step 414.

Having concluded the foregoing discussion of a multi-track data transfer operation which the disc drive 200 can advantageously perform, additional advantages of the disc drive 200 will now be briefly reviewed. One such advantage is the capability of configuring the drive 200 to operate like a RAID, with the top actuator assembly 202 and associated discs operating as a "first drive" and the bottom actuator assembly 204 and associated discs operating as a "second drive." An improved minimum sustainable data transfer rate can thus be achieved by writing a greater percentage of a given set of data at tracks disposed at the outer diameters (ODs) of the discs as compared to the percentage of the data written at tracks disposed at the inner diameters (IDs) of the discs.

Another important advantage of the dual actuator assembly configuration of the disc drive 200 is the minimization of space required within the disc drive 200. That is, by disposing the dual, independently rotatable actuator assemblies 202, 204 for movement about a common axis (i.e., the axis 206 of FIG. 2), and combining the associated voice coil motors into the combined VCM 228 (FIG. 2), the footprint of the actuator assemblies 202, 204 is substantially the same as with a prior art disc drive (such as 100). This is an immensely important consideration, as form factors for disc drives are generally standardized within the industry and disc drive designers are continually challenged to locate all of the requisite mechanical components within the allotted volume while achieving ever greater levels of disc drive performance.

Moreover, it will be recognized that the dual actuator assembly configuration of the disc drive 200 provides significant manufacturing advantages, in that existing components from related drive lines can be readily incorporated into the dual actuator assembly configuration. For example, two actuator assemblies of the type utilized in a "low-profile" form factor disc drive design having five discs can be readily modified for use as the disclosed top and bottom actuator assemblies 202, 204 for the ten discs 208, 210, 212, 214, 216, 218, 220, 222, 224 and 226, saving development and time-to-market costs.

Although preferred embodiments have been presented herein for two actuator assemblies (202, 204) and ten discs (208, 210, 212, 214, 216, 218, 220, 222, 224, 226) so that each of the actuator assemblies accesses top and bottom recording surfaces of separate sets of discs, it will be readily understood that the present invention as claimed below is not so limited. For example, more than two axially aligned actuator assemblies could be used. Further, multiple actuator assemblies could access different sides of one or more discs; for example, the foregoing discussion could be readily modified to a single disc system wherein two independently rotatable, axially aligned actuators (each having one actuator arm and one head) access different sides of a single disc. These and other modifications are contemplated as being readily within the ability of those skilled in the art to implement in view of the foregoing discussion and are accordingly considered to be within the spirit and scope of the appended claims.

From the foregoing discussion it will now be clearly understood that the present invention is directed to a method for fabricating a dual actuator assembly for use in a disc drive.

As exemplified by preferred embodiments, a disc drive (such as 200) is provided having a plurality of rotatable discs (208, 210, 212, 214, 216, 218, 220, 222, 224, 226) which are axially aligned for rotation, the discs being divided into first and second sets of adjacently disposed discs (208, 210, 212, 214, 216 and 218, 220, 222, 224, 226, respectively).

A dual actuator assembly is disposed adjacent the discs having a first actuator assembly (202) which is mounted for rotation about a common axis (206) and supports a plurality of read/write heads (120) over corresponding recording surfaces of the first set of adjacently disposed discs. The dual actuator assembly further has a second actuator assembly (204) which is adjacent the first actuator assembly, mounted for rotation about the common axis, and supports a plurality of read/write heads over corresponding recording surfaces of the second set of adjacently disposed discs.

The first and second actuator assemblies are independently rotatable about the common axis, facilitating improved data transfer performance by using one of the actuator assemblies to transfer data while the other actuator assembly is positioned for subsequent data transfer.

In accordance with a preferred method of fabrication for the dual actuator assembly, a dual bearing cartridge assembly (270) is provided with a stationary shaft (272) aligned along the common axis having first and second ends (286), a first rotatable sleeve (274) mounted for rotation about the stationary shaft toward the first end, a second rotatable sleeve (276) mounted for rotation about the stationary shaft toward the second end, and first and second bearing assemblies (280, 282) supporting the first and second rotatable sleeves, respectively.

A support member (310) is inserted between the first and second rotatable sleeves to reduce preload of the first and second bearing assemblies, allowing attachment of the first and second actuator assemblies to the first and second rotatable sleeves, respectively while preventing damage to the bearing assemblies. The support member has a pair of support arms (312) each having a circumferentially extending wedge (314) so that, when the support arms are urged in a plane orthogonal to the common axis, the wedges exert a separating force upon the first and second rotatable sleeves to reduce the preload of the first and second bearing assemblies.

For purposes of the following claims, the phrase "data transfer," and similar phrases, will be readily understood in accordance with the foregoing discussion to describe a read or write operation wherein data are transferred between a disc drive (200) and a host computer (350). The phrase "actuator assembly" will be readily understood to describe a disc drive component mounted adjacent one or more rotatable discs and used to access such discs, as with the actuator assemblies 202, 204 discussed hereinabove.

The phrase "axially aligned for independent rotation about a common axis," and similar such phrases, will be clearly understood to describe components that are axially aligned along the same axis (such as the actuator assemblies 202, 204 discussed herein) and will not be extended to cover components that are not nominally axially aligned, such as exemplified in the aforementioned U.S. Pat. No. 5,343,345 which shows separate actuator assemblies disposed at opposite ends of a stack of discs, and hence not axially aligned about a common axis.

Finally, although method steps have been set forth in various claims in a particular order, it will be recognized that the scope of such claims is not necessarily limited to performance in such order.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for fabricating a dual actuator assembly having first and second rotatable actuator assemblies which are axially aligned for independent rotation about a common axis and supporting at least first and second read/write heads, respectively, comprising steps of:

(a) providing a dual bearing cartridge assembly comprising a stationary shaft aligned along the common axis having first and second ends, a first rotatable sleeve mounted for rotation about the stationary shaft toward the first end, a second rotatable sleeve mounted for rotation about the stationary shaft toward the second end, and first and second bearing assemblies supporting the first and second rotatable sleeves, respectively;

(b) inserting a support member between the first and second rotatable sleeves to provide a supporting force in opposition to the preload of the first and second bearing assemblies; and (c) attaching the first and second actuator assemblies to the first and second rotatable sleeves, respectively.

2. The method of claim 1, wherein the support member comprises a pair of support arms each having a circumferentially extending wedge so that, when the support arms are urged in a plane orthogonal to the common axis, the wedges exert a separating force upon the first and second rotatable sleeves to oppose the preload of the first and second bearing assemblies.

3. The method of claim 1, wherein the attaching step (c) comprises pressing the first and second actuator assemblies onto the first and second rotatable sleeves, respectively.

4. The method of claim 1, wherein the providing step (a) comprises steps of:

(a1) providing the stationary shaft as a substantially cylindrical member having an outer surface at a substantially nominal shaft radius and a substantially centrally disposed, circumferentially extending step having a step radius greater than the nominal shaft radius;

(a2) pressing the first bearing assembly onto the stationary shaft from the first end until an inner race of the first bearing assembly abuts the step;

(a3) pressing the second bearing assembly onto the stationary shaft from the second end until an inner race of the second bearing assembly abuts the step opposite the first bearing assembly;

(a4) pressing the first rotatable sleeve onto the first bearing assembly; and (a5) pressing the second rotatable sleeve onto the second bearing assembly.

5. The method of claim 4, wherein the providing step (a) further comprises a step of:

(a6) attaching first and second circumferentially extending tolerance rings to respective outer surfaces of the first and second rotatable sleeves, the tolerance rings subsequently exerting radially extending forces upon the first and second actuator assemblies to maintain the first and second actuator assemblies in a desired spatial relationship along the common axis.

* * * * *